US009357499B2

(12) United States Patent
Yu

(10) Patent No.: US 9,357,499 B2
(45) Date of Patent: May 31, 2016

(54) METHOD AND APPARATUS FOR ENERGY SAVINGS AND INTERFERENCE REDUCTION IN A WIRELESS COMMUNICATIONS NETWORK

(71) Applicant: QUALCOMM Incorporated, San Diego, CA (US)

(72) Inventor: Zhi-Zhong Yu, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 13/733,871

(22) Filed: Jan. 3, 2013

(65) Prior Publication Data

US 2013/0344911 A1 Dec. 26, 2013

Related U.S. Application Data

(60) Provisional application No. 61/663,505, filed on Jun. 22, 2012.

(51) Int. Cl.

| | |
|---|---|
| ***H04W 52/04*** | (2009.01) |
| ***H04W 52/32*** | (2009.01) |
| ***H04W 52/34*** | (2009.01) |
| ***H04W 52/40*** | (2009.01) |
| ***H04W 52/02*** | (2009.01) |
| *H04W 52/24* | (2009.01) |
| *H04W 52/36* | (2009.01) |

(52) U.S. Cl.

CPC .......... *H04W 52/04* (2013.01); *H04W 52/0206* (2013.01); *H04W 52/322* (2013.01); *H04W 52/343* (2013.01); *H04W 52/40* (2013.01); *H04W 52/244* (2013.01); *H04W 52/362* (2013.01); *Y02B 60/50* (2013.01)

(58) Field of Classification Search

CPC .................................................... H04W 52/04

See application file for complete search history.

(56) References Cited

U.S. PATENT DOCUMENTS

| | | | | |
|---|---|---|---|---|
| 6,119,010 | A | 9/2000 | Labedz | |
| 6,490,257 | B1 * | 12/2002 | Watanabe ............ | H04B 7/0608 370/318 |
| 6,728,550 | B1 | 4/2004 | Bohnke et al. | |
| 7,050,824 | B2 | 5/2006 | Masseroni et al. | |
| 7,831,273 | B2 | 11/2010 | Suonvieri | |

(Continued)

FOREIGN PATENT DOCUMENTS

| | | | |
|---|---|---|---|
| EP | 0892572 | A1 | 1/1999 |
| EP | 1067816 | A1 | 1/2001 |

(Continued)

OTHER PUBLICATIONS

International Search Report and Written Opinion—PCT/US2013/046661—ISA/EPO—Sep. 16, 2013.

(Continued)

*Primary Examiner* — Bobbak Safaipour
(74) *Attorney, Agent, or Firm* — Larry J. Moskowitz

(57) ABSTRACT

Disclosed are systems and methods to affect the activity of a base station transmitter (BTS) in a cellular communications network based, at least in part, on operating conditions. In one particular example implementation, a BTS in a cellular communication network may be placed in a reduced power consumption state in response to events or conditions indicative of reduced demand for service in the cell serviced by the BTS.

31 Claims, 6 Drawing Sheets

| TS 0 | TS 1 | TS 2 | TS 3 | TS 4 | TS 5 | TS 6 | TS 7 | TS 0 | TS 1 | TS 2 | TS 3 | TS 4 | TS 5 | TS 6 | TS 7 |
|---|---|---|---|---|---|---|---|---|---|---|---|---|---|---|---|

(56) References Cited

U.S. PATENT DOCUMENTS 8,825,048 B2* 9/2014 Kang .................... H04W 8/26 455/434
2003/0026324 A1* 2/2003 Li ........................ H04W 52/08 375/141
2006/0062179 A1* 3/2006 Simonsson ............ H04W 4/06 370/328
2006/0246895 A1* 11/2006 Ryu ..................... H04W 48/20 455/434
2008/0130593 A1* 6/2008 Scheinert ............... H04W 8/30 370/337
2010/0316033 A1* 12/2010 Atwal ................ H04W 74/002 370/338
2010/0317394 A1 12/2010 Harris et al.
2011/0021186 A1* 1/2011 Fischer ................. H01Q 1/246 455/424
2011/0205887 A1 8/2011 Wu et al.
2012/0051260 A1 3/2012 Tamaki
2012/0083241 A1* 4/2012 Annamalai .......... H04W 64/00 455/404.2
2012/0106504 A1* 5/2012 Klatt .................... H04W 16/12 370/330
2012/0115541 A1 5/2012 Suga
2013/0070615 A1* 3/2013 Lennartson ......... H04W 52/343 370/242
2013/0143550 A1* 6/2013 Ostrup ................. H04W 24/10 455/424
2013/0203419 A1* 8/2013 Siomina ............... H04W 36/18 455/437

FOREIGN PATENT DOCUMENTS

EP 2373088 A2 10/2011
WO 2007085701 A1 8/2007
WO 2010093296 A1 8/2010
WO 2011145992 A1 11/2011
WO 2012023415 A1 2/2012

OTHER PUBLICATIONS

Kashima T., et al., “Load Balancing Effect of Inter-Frequency Handover with Pilot Power Tuning in UTRAN”, Proceedings / 2004 IEEE 59th Vehicular Technology Conference, VTC 2004—Spring: Towards a Global Wireless World; May 17-19, 2004, Milan Italy, IEEE Operations Center, Piscataway, NJ, vol. 4, May 17, 2004, pp. 1973-1977, XP010766507.

Partial International Search Report—PCT/US2013/046661—ISA/EPO—Aug. 6, 2013.

* cited by examiner

METHOD AND APPARATUS FOR ENERGY SAVINGS AND INTERFERENCE REDUCTION IN A WIRELESS COMMUNICATIONS NETWORK

This application claims the benefit of U.S. Provisional Patent Application No. 61/663,505, titled "METHOD AND APPARATUS FOR ENERGY SAVINGS IN WIRELESS COMMUNICATIONS," filed on Jun. 22, 2012, assigned to the assignee of claimed subject matter and incorporated herein by reference in its entirety.

BACKGROUND

1. Field

Subject matter disclosed herein relates generally to energy savings in wireless communications.

2. Information

Base station transceivers (BTS) in conventional wireless communications systems typically operate at full power during both periods of high call volume and low call volume. In the case of the Global System for Mobile Communications (GSM)/Edge Radio Access Network (GERAN) network, there are over five billion mobile phone users. To enable acquisition by a mobile device, among other things, a BTS in a GERAN communication system typically transmits broadcast control channel (BCCH) carrier signal continuously on timeslot 0 at a constant transmission power. Operation of a BTS, and its transmitter, in a GERAN communication system typically consumes a substantial amount of power due to its constant full power operation on BCCH, regardless of a size of the cell covered by the BTS or time of day of operation. This not only wastes electricity, but also imposes interference unnecessarily in certain cases.

BRIEF DESCRIPTION OF THE FIGURES

Non-limiting and non-exhaustive implementations will be described with reference to the following figures, wherein like reference numerals refer to like parts throughout the various figures unless otherwise specified.

SUMMARY

Figure 1:
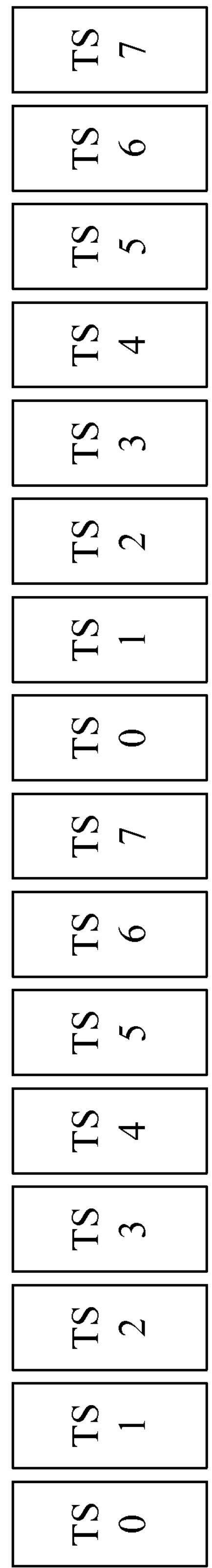
FIG. 1 shows an example of a carrier signal generated in timeslots according to a constant transmission power profile according to an embodiment.

One particular implementation comprises: a method, at a base station in a cellular communication network, comprising: determining a reduced cellular traffic condition; and transitioning transmission of a broadcast control channel (BCCH) carrier signal to a reduced power state in response to determining said reduced traffic condition.

Another particular implementation comprises: an apparatus comprising: a base station comprising: a transceiver to transmit a broadcast control channel (BCCH) carrier signal; and a processor to: determine a reduced cellular traffic condition; and initiate transition of transmission of said BCCH carrier signal to a reduced power state in response to determining said reduced traffic condition.

Another particular implementation comprises: an article comprising: a non-transitory storage medium comprising machine-readable instructions stored there which are executable by a special purpose computing apparatus to: determine a reduced cellular traffic condition in a cell of a cellular communication network; and initiate transition of transmission of a broadcast control channel (BCCH) carrier signal to a reduced power state in said cell in response to determining said reduced traffic condition.

Another particular implementation comprises: an apparatus comprising: means for determining a reduced cellular traffic condition in a cell of a cellular communication network; and means for transitioning transmission of a broadcast control channel (BCCH) carrier signal to a reduced power state in response to determining said reduced traffic condition.

Another particular implementation comprises: a method comprising: monitoring a first cell of a cellular communications network to detect a reduced traffic condition initiating a handover of one or more calls from the first cell to a second cell in response to detection of the reduced traffic condition; and transmitting a signal to the first cell to place the first cell in a reduced power state in response to detection of the reduced traffic condition.

Another particular implementation comprises: an apparatus comprising: a transmitter; and a processor to: monitor a first cell of a cellular communications network to detect a reduced traffic condition; initiate a handover of one or more calls from the first cell to a second cell in response to detection of the reduced traffic condition; and initiate transmitting a signal through the transmitter to the first cell to place the first cell in a reduced power state in response to detection of the reduced traffic condition.

Another particular implementation comprises: an article comprising: a non-transitory storage medium comprising machine-readable instructions stored thereon which are executable by a special purpose computing apparatus to: monitor a first cell of a cellular communications network to detect a reduced traffic condition; initiate a handover of one or more calls from the first cell to a second cell in response to detection of the reduced traffic condition; and initiate transmission of a signal to the first cell to place the first cell in a reduced power state in response to detection of the reduced traffic condition.

Another particular implementation comprises: an apparatus comprising: means for monitoring a first cell of a cellular communications network to detect a reduced traffic condition; means for initiating a handover of one or more calls from the first cell to a second cell in response to detection of the reduced traffic condition; and means for transmitting a signal to the first cell to place the first cell in a reduced power state in response to detection of the reduced traffic condition.

Another particular implementation comprises: a method comprising: monitoring a cellular call traffic load at a macro cell; and initiating one or more micro cells in said macro cell operating at a reduced power state to resume operation at a higher power state in response to detecting an increase in said cellular call traffic load.

Another particular implementation comprises: a method comprising: monitoring a cellular call traffic load at a cell and the acceptable interference levels to other cells; and initiating an optimized power state to adapt to dynamic operations at different power state in response to detecting variations of cellular traffic load and demand.

It should be understood that the above identified embodiments and implementations are merely example embodiments and implementations, and that claimed subject matter is not limited in these respects.

DETAILED DESCRIPTION

Reference throughout this specification to "one implementation," "an implementation," "certain implementations," "some implementations," "one embodiment," "an embodiment," "an example embodiment," "various implementations," or "various embodiments" means that a particular feature, structure, or characteristic described in connection with a described implementation may be included in at least one implementation of claimed subject matter. Thus, appearances of the phrase "in an embodiment," "in one embodiment," "in an example embodiment," "in one example implementation," "in an example implementation," "in certain example implementations," "in some example implementations," or "in various example implementations" in various places throughout this specification are not necessarily all referring to the same implementation(s). Furthermore, particular features, structures, or characteristics may be combined in one or more implementations.

Alternative solutions to reduce or optimize energy (power) utilization in wireless communications are described below. These methods utilize adaptive techniques that enable a wireless communications system (or operator thereof) to adjust power utilization based, at least in part, on varying capacity (e.g., power level of transmissions, active mobile stations (MSs), etc.), interference levels, different cell sizes and any requirements for penetration of various levels into/through objects at one or more locations. Moreover, the described methods may be adaptable to operate with both new and legacy equipment without deviating from claimed subject matter.

In particular implementations, a cell in a cellular network or BTS serving a cell in a cellular network may be placed in a "powered down," "reduced power," or "shut down" in which at least one component, function or aspect of the cell or BTS operates in a mode that consumes reduced power. Such a transition to a powered down, reduced power or shut down state may be initiated by conditions or events indicating, for example, that cellular traffic is relatively low and/or interference is relative high. In other implementations, a cell or BTS in powered down, reduced power or shut down state may transition to a resume, higher power or full power state in response to changing conditions that may indicate an increase in cellular traffic.

In a particular implementation of a cellular network, such as a GSM EDGE Radio Network (GERAN) utilizing eight timeslots TS0-TS7, a broadcast control channel (BCCH) carrier signal on TS0 at full power, and other timeslots are transmitted at the full power level continuously. Transmission power of a BCCH carrier on timeslots TS0-TS7 may occur at a constant, uniform level even if only a single time slot TS0 is being used, as shown in FIG. 1 (where the vertical height of a time slot represents a corresponding BCCH carrier transmission power level). This may be referred to as a constant transmission power profile. Transmission power may be kept full, regardless of the size of the cell. They adapt to the size of cells by antenna tilting angles.

In a constant transmission power profile, a transmission power level a BCCH carrier signal may be constant across multiple timeslots so that while an MS performs a power scan for cell selection or re-selection, the MS may quickly acquire a BCCH carrier signal. This may simplify a cell acquisition operation. However, an MS may also be capable of acquiring a BCCH carrier signal transmitted at lower (or varying) power levels. For example, while an MS is travelling, it may be able to continue to detect and acquire a BCCH carrier signal even though such movement may result in fading, introducing a variation in the carrier power levels (e.g., up to +/−20 dBs).

Figure 2:
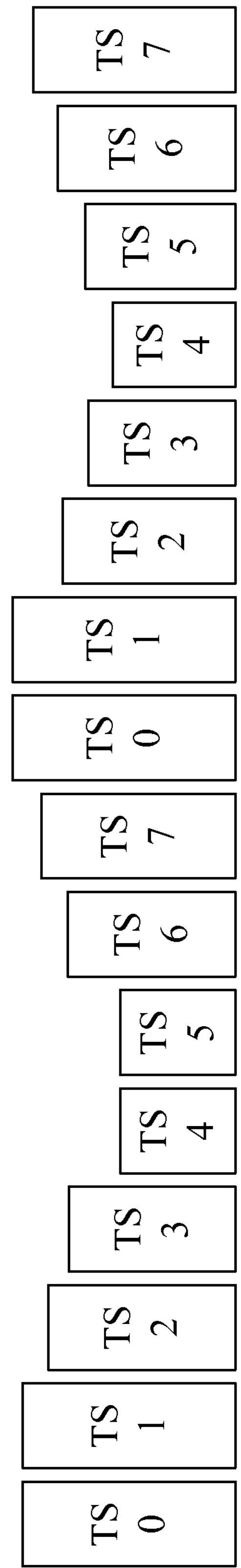
FIG. 2 shows an example of a carrier signal timeslots according to a variable transmission power profile according to an embodiment.

In a particular implementation, features of an MS to maintain satisfactory communications quality in the presence of fading conditions (e.g., RF signal fading, power fading, etc.) may also enable the MS to acquire a BCCH carrier signal transmitted at a reduced power level. In a particular implementation, a transmission power for a BCCH carrier signal may be reduced or varied as shown in FIG. 2 according to a variable transmission power profile. Antenna tilting angle could also be replaced by enabling a suitable level of transmission power and avoid the full power if the size of the cell is smaller than a coverage range at full power transmission. As discussed below, application of such a variable BCCH transmission power profile may reduce costly transmission of a BCCH carrier at full power over timeslots TS0 through TS7 (e.g., as shown in the profile of FIG. 1) and reduce unnecessary interference to other neighboring cells while maintaining satisfactory performance.

In one example, if a MS device is idle (e.g., inactive, quiet, not transmitting or receiving), the MS may be statistically assumed to be static (not moving). Here, varying or reducing transmission power of some TS0 BCCH carrier scanned by the MS while in this idle state may produce an effect similar to fading. As shown in FIG. 2, in an embodiment, two timeslots (e.g., TS0 and TS1) may be transmitted at the same power level to provide the desired cell coverage, but remaining timeslots (e.g., TS2-TS7), while not in use, may be transmitted at power levels that may be dynamically varied or reduced, thus reducing an overall transmission power or transmission energy.

In a particular implementation, a variable transmission power profile may vary transmission power of a BCCH carrier signal on a timeslot by timeslot basis according to a set pattern in which TS0 is on the required power level for the cell, while other timeslots have a stepped lower power when not in use. This to certain degree may assist an MS in identifying TS0 and provide additional assistance to the MS in acquiring a FCCH quickly when the low power profile on TS1 to TS7 are predetermined. A power profile may also be arranged in such way to form the pattern as shown in FIG. 2. In an example embodiment, a transmission power for transmission of a BCCH carrier signal may be varied on fixed increments (e.g., 3.0 dB) where the required power transmission levels may be normalized to a value of one. In a particular implementation, an example variable transmission power profile may vary transmission power on timeslots as follows:

$1/8 * 1/2 * 2 = 1/8$ and thus 1/8 of the power of TS2 and TS7 is reduced from full power;

$1/8 * 1/4 * 2 = 1/16$ and thus 1/16 of the power of TS3 and TS6 is reduced from full power; and $1/8 * 1/8 * 2 = 1/32$ and thus 1/32 of the power of TS4 and TS5 is reduced from full power.

Figure 3:
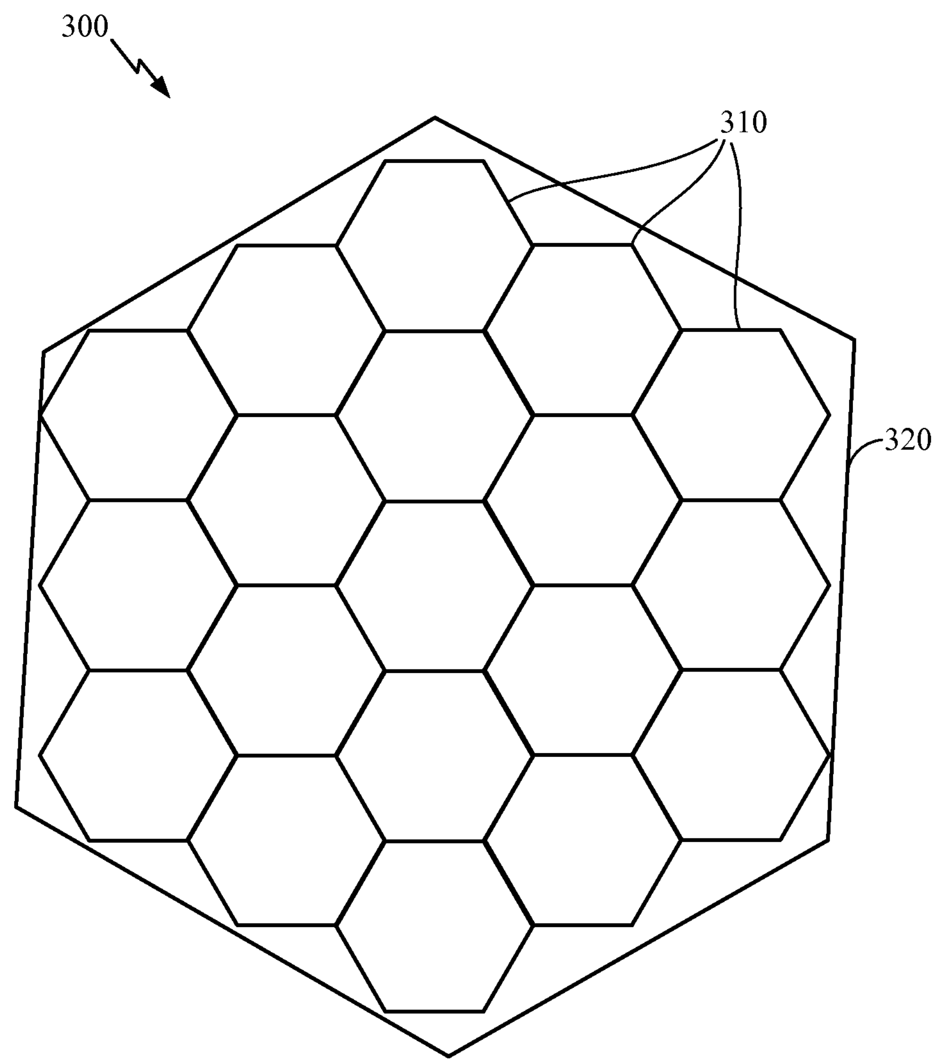
FIG. 3 is a plan view of cells of a cellular configuration in a wireless network according to an embodiment.

In a particular implementation, multiple BTS' in a cellular communication network may be arranged in cell coverage areas where a single cell is defined by a service coverage area of a corresponding base station transceiver (BTS). Here, a BTS may have an associated coverage area determined based, at least in part, on a transmitted signal strength. In a particular implementation, multiple BTS' and associated cell coverage areas may be combined to form a larger overall coverage area for a cellular communication network. As shown FIG. 3, a micro cell 310 may have a small relative coverage area and a macro cell 320 has a larger coverage area including at least one micro cell 310. A macro cell 320 may be deployed to overlap and fill gaps among multiple micro cells 310 to act as an umbrella cell.

In particular implementations, an MS may travel between coverage areas of multiple micro cells 310 within the coverage of macro cell 320. Here, as an MS moves out of or away from a coverage area of a first micro cell (or approaches the limits of the coverage area of the first micro cell), the MD device may connect or reselect with an adjacent micro cell in a "handover" operation. While a reduction in transmission power at a BTS according to a variable transmission power profile may affect or at least temporarily reduce the coverage area of the first micro cell (at least in particular BCCH carrier timeslots), sufficient coverage (e.g., overlapping coverage) at the adjacent micro cell to enable a handover may prevent a discontinuity in coverage as the MS transitions between the micro cells.

In particular implementations, a variable transmission power profile may be selectively applied to transmission of a BCCH carrier signal over timeslots for a BTS. For example, such a variable transmission power profile may be applied during certain periods such as periods during which network traffic is expected to be light. During these periods, an active MS may still receive acceptable quality of service (e.g., with sufficient coverage to avoid noticeable bad frames for CS service and CRC failures for data service and dropped calls). In one particular implementation, a power transmission profile for a BCCH carrier signal at a BTS may be determined adaptively based, at least in part, on the presence or absence of network traffic. In one example, a variable transmission power profile may specify transmission of a BCCH carrier signal at full power for timeslot TS0 with merely lower transmission power bursts for timeslots TS1 through TS7. If timeslot TS0 is not acquired, then transmission of lower transmission power bursts at timeslots TS1 through TS7 may be continued. In yet another implementation, more than one time slot among timeslots TS0 through TS7 may be transmitted at full power while other timeslots may, one by one, be incrementally transmitted at full power. Here, transmission power for a BCCH carrier signal may be incrementally increased or decreased depending on the whether network traffic is perceived as either increasing or decreasing. For existing traffic arranged on TS1 to TS7, a power profile may be arranged such that it may assist the MS in finding TS0 for the initial acquisition of the serving cell.

In the particular example variable transmission power profile shown in FIG. 2, transmission power of a BCCH carrier signal may be variably adjusted in timeslots TS2-TS7. The transmission power level of a BCCH carrier signal on timeslot TS0 may be maintained at sufficient (not have to be full) power if an MS bases its respective connection (selection) decision on that timeslot. In particular embodiments, however, transmission power of a BCCH carrier signal on timeslot TS0 may be set to a sufficient power level, which is not necessarily the full power. A tilting angle may be adjusted to adapt to a particular cell size. Here, an MS may have the capability to adapt to a variety of conditions including fading as mentioned above.

In an embodiment, a frequency correction channel (FCCH) may be transmitted in a BCCH carrier signal. During a process to search an FCCH in a BCCH, an MS may arrange for more than one BCCH frame (e.g., 10 or 11 frames, or 80 to 88 timeslots) for an initial acquisition of a cell base station identity code (B SIC). Application of a variable transmission power profile in transmission of a BCCH carrier signal as shown in FIG. 2 may enable a monitoring period for search and acquisition of an FCCH to be broken up into smaller intervals (e.g., 1.5 timeslots) to position an acquisition window for acquiring an FCCH. One benefit of having such power profile, in addition to energy saving, is that just with 1.5 timeslots a monitoring MS may be able to determine whether TS0 has passed or is expected to arrive. There is no need to wait for 88 timeslots to capture an FCCH, especially in inter-Radio Access Technology cases.

In a particular alternative implementation while TS1 to TS7 are used for traffic, a BTS may individually allocate those BCCH carrier time slots for transmission of a traffic signal at different power levels in a variable transmission power profile for different MSs based, at least in part, on certain detected conditions. According to an embodiment, particular BCCH carrier timeslots in a variable transmission power profile may be allocated to an MS based, at least in part, on the basis of a required downlink power level from BTS to the MS. The aforementioned condition of fading may increase as a distance or path loss from a serving BTS and MS increases. Here, an MS at a closer range may be allocated a timeslot that is transmitted at a power less than full power, such as TS3 and TS4, further away from TS0, while an MS at a longer range may be allocated a timeslot transmitted at full power, such as TS7 and TS2, close to TS0. This means that the timeslot allocation can link to the downlink power required by the MSs in active state, with downlink data traffic, link to the downlink power required by the MSs to form the power profile that is helpful for the MSs to make initial acquisitions. In another embodiment, a BTS may allocate each TS1-TS7 timeslot of BCCH carrier to different group of low throughput packet data MS users, at least in part, based on similarity of the MS's downlink power required, in order to keep the power profile. As pointed out above in reference to FIG. 3, micro cells 310 may execute a handover as an MS transitions from a coverage area of a first micro cell 310 to a coverage area of an adjacent micro cell 310, which may entail an increase transmission power for short period of time before handover to a macro cell is complete. In one implementation, multiple BTS' serving one or more micro cells 310 may be at least partially powered down, one by one, as demand of service reduces. If a remaining reduced capacity in a macro cell 320 is capable of servicing a current network traffic load taken by the remaining microcells 310, the remaining microcells 310 may start to handover subscribers to the macro cell. Remaining microcells 310 may be powered down until such time as network load increases. While remaining microcells 310 handover calls to the macro cell, the macro cell may predict a future increase or resumption of demand and prepare to wake up microcells which had been powered down. The macro cell may first update a BA list of the microcells it is going to wake up, and then communicate with them to initiate microcells' BCCH carriers. For active calls, a handover command can be issued to the microcell and those MSs in an idle state may reselect naturally as the microcells are up. There may be communications between the umbrella cell and the microcells it covers to know the loading situation and resource usage details.

In an embodiment, a network may determine inactive (idle, quiet) MSs in a region and their respective locations according to their location area update; and active MSs by taking measurements (e.g., including signal strength measurements, etc.).

Handover/reselection operations for putting a microcell to sleep, or waking a sleeping microcell as described herein may be accomplished, for example, in response to an update of a BCCH allocation list (BA) on an umbrella (macro) cell and local (micro) cells. By incrementally reducing a transmission power level of BCCH carrier signals of microcells in a step-by-step fashion, MSs may be reselected to umbrella cell(s) listed in a BA list of microcells that are going to sleep. A handover command may be issued from microcell to other cells that are still in operation. The microcells may then be transitioned to a lower power operational state (e.g., go to sleep) until a subsequent busy period. A wake up procedure may include one or more of the following:

1. simple timed or event based wake-up call from microcells themselves;

2. sleeping microcells listen to the density of traffic, wake themselves up if traffic is detected as heavy (this may entail simple procedures for microcells monitoring macrocells ARFCNs and timeslot usage from time to time); and 3. a macrocell may wake-up microcells in the macrocell's if detected if traffic is detected to be over a certain watermark level.

According to an embodiment, mobile devices in a cellular network may operate in a mobile originated (MO) and mobile terminated (MT) calls. The frequency of these calls may fluctuate throughout any particular day. Reducing transmission power of a BCCH carrier signal on timeslots may delay acquisition of the BCCH carrier signal to initiate a call. However, during non-peak or low volume periods (e.g., while reducing transmission power of BCCH carrier in TS1-TS7 timeslots), a short delay in starting a call (e.g., by 3.0 to 5.0 seconds) may be acceptable. As such, reducing power on timeslots may have an acceptable impact on quality of service.

In an embodiment, a macro cell may execute a handover of an MS to a micro cell 310 on a condition that added capacity in the network is desired (e.g., if the micro cell BTS is powered up). In one example of a handover, as an MS travels from one location to another, a signal transmitted from the BTS of a serving cell and received at the MS may become weak. The MS may perform measurements and access a list of neighboring cells (micro or macro). Based at least in part on a list of neighboring cells and signal measurements, the MS may reselect (connect to) a more favorable cell (e.g., a cell with sufficient signal strength to provide a higher quality of service (QoS)). In another scenario, traffic in a micro cell that is servicing an MS may be reduced by a handover of calls from the micro cell to a macro cell acting as an umbrella cell. Here, a micro cell may initiate a handover of a call of the MS from a micro cell to the macro cell before the microcell goes to sleep. By reducing traffic on the microcell, a BTS serving the microcell may reduce power step by step until shut down in a manner as discussed above. A communication between the macrocell and microcell on the loading situations and wake-up and go-to-sleep may enhance timeliness of such operations.

In an embodiment, a variable transmission power profile may be determined, as illustrated above in FIG. 2, based at least in part on at least one of measurements (e.g., traffic volume, etc.), time of day, location, or events, just to provide a few examples. For example, a BTS in a ski resort may utilize less capacity in the summer, allowing the use of a variable transmission power profile or even sleeping of microcells to shut down unneeded or underutilized micro cells. Likewise, in a given region, MS traffic volume may be lower at midnight than at noon allowing the use of a variable power profile and sleep to deactivate unneeded or underutilized micro cells at midnight and increase a number of higher capacity micro cells at noon (e.g., using a higher power profile or using a constant transmission power profile similar to the power level shown in FIG. 1). Similarly, deactivated micro cells may be reactivated if desired (e.g., based on, at least in part, traffic volume or other increased cellular traffic condition) or at specific time periods (e.g., specific time, event, season, etc.).

In one embodiment, a cellular call traffic load at a macro cell may be monitored. One or more micro cells in the macro cell operating in a reduced power state may be initiated to operate at a higher power state in response to detecting an increase in the cellular call traffic load. In one particular implementation, the cells may selectively determine loading of the cellular traffic load at the macro cell. In another implementation, a BCCH allocation list may be updated in response to initiating the one or more micro cells in the macro cell operating at a reduced power state to resume operation at a higher power state. In another implementation, the one or more micro cells may resume operation at the higher power state based, at least in part, on a changing transmission power of a BCCH carrier signal. In another implementation, the one or more micro cells may be transitioned to the reduced power state at a first rate and resume to operation at the higher power state at a second rate higher than the first rate. In another implementation, handover of calls between the macro cell and at least of the one or more micro cells may occur in response to changes in a power state of the one or more micro cells.

Furthermore, while micro cells may be used in combination with a macro cell to cover areas that may not be effectively covered by the single macro cell, a corresponding variable transmission power profile may be applied to one or more of the microcells to cover a desired coverage footprint (e.g., sufficient power to provide an adequate QoS for MSs in (connected to) the cell(s)) while reducing transmission power and/or transmitted energy.

Figure 4:
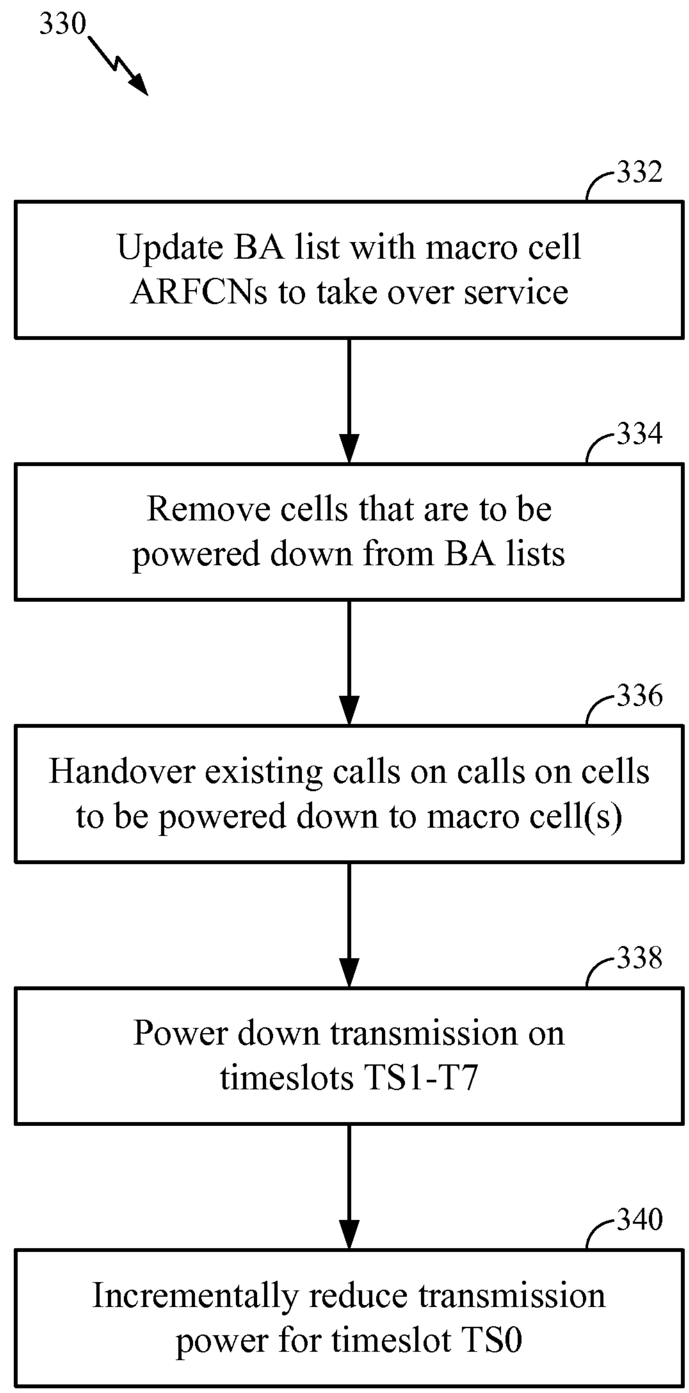
FIG. 4 is a flow diagram of a process to incrementally reduce transmission power at a transmitter according to an embodiment.

In an embodiment, a network may monitor a load capacity (e.g., call volume (load) of at least one cell). According to an embodiment, a cellular base station may transmit "dummy bursts" to enable continuity if there are not enough traffic to make full use of TS1 to TS7 in BCCH carrier. For example, time slot TS0 is for BCCH while other timeslots TS1-TS7 may be dummy bursts. Here, a load capacity or call volume of a cell may be monitored based, at least in part, on the presence of dummy bursts in BCCH carrier signal timeslots. Cells exhibiting this behavior may be candidates for shutting down, going to sleep or otherwise transition to a reduced power state. In a particular implementation, cells that are candidates for shutting down, going to sleep or otherwise transitioning to a reduced power state may be selected to gradually reduce call capacity so as to not initiate any abrupt changes in network service. FIG. 4 is a flow diagram of a process 330 for transitioning one or more cells of a cellular communication network to a power saving mode according to an embodiment. Process 330 may be initiated by any one of several conditions or events such as, for example, detection of dummy bursts over a period of time as discussed above. At block 332, a BCCH allocation (BA) list may be updated with absolute radio-frequency channel numbers (ARFCNs) of macro cell(s) available to service calls that are to be handed over from microcell(s) to be powered down or shut down. At block 334, cells that are to be powered down or shut down may be removed from BA lists. At block 336, existing calls at microcells to be powered down or shut down may be handed over to macro cells to maintain uninterrupted service to these calls.

Following handover of calls to macro cells at block 336, microcells to be powered down may be gracefully or incrementally powered down to a reduced power state. Here, gracefully or incrementally powering down a microcell may enable a quicker resume to full power operations if a change in conditions would warrant resuming to full power. As pointed out above, an idle or underutilized microcell may transmit dummy bursts on BCCH carrier signal timeslots TS1 through TS7. At block 338, BCCH bursts in timeslots TS1 through TS7 may be powered down. In particular implementations, these BCCH timeslots may be powered down in sequence, one at a time, or all at once. If a remaining timeslot TS0 is still powered, the power of this remaining timeslot TS0 may be slowly reduced to prevent an abrupt loss of service. For example, such a remaining timeslot TS0 may be powered down completely over a duration such as 10.0 minutes.

As pointed out in particular embodiments above at blocks 338 and 349, a BTS of a microcell may power down transmissions of a BCCH carrier signal over timeslots TS0 through TS7. In particular implementations, however, certain functions of the BTS may remain powered. For example, even if a BTS powers down transmission in BCCH timeslots in a power down or shut down condition, BTS receiver and data processing electronics may remain powered. Here, such a BTS may be capable of feeding some communications back to an umbrella cell to assist in determining conditions that are to awaken the BTS to a full power state (e.g., for transmitting a BCCH carrier signal at a transmission power according to a constant transmission power profile as shown in FIG. 1), for example.

In one implementation, in powering down, shutting down or otherwise transitioning to a reduced power state microcells as discussed above, a paging area may be substantially maintained by, for example, selecting particular microcells to be shut or powered down while allowing other particular microcells serving the paging area to remain at full power. As selected microcells are transitioned to a lower power state, a macro cell may take over paging responsibilities for the selected micro cells. This flexibility can adapt to the real situations where the sleeping time are different for each microcell.

If one or more microcells are placed in a shut down, powered down or otherwise reduced power state in response to a condition such as reduced network traffic as described above, a microcell may resume to a higher or full power state in response to a change in conditions such as increased traffic. An increased traffic condition may be detected using any one of several observations. For example, an increased traffic condition may be detected from concurrently observing: 1. that the serving macro cell hit watermark of capacity threshold; 2. sleeping microcells may monitor microcell ARFCNs and detect well occupied timeslots and high RxLev on the uplink (UL) (e.g., an MA list of the macro cell may be passed to the microcells for monitoring purposes-one of the mechanism for assisting wake up procedures). In one embodiment, at a powered down or shut down microcell, software and/or other computing resources at a BTS or base station controller (BSC) may remain active to respond to a signal for awakening the microcell to a higher or full power state. In response to such a wake up signal received at a BTS, the BTS may apply full transmission power to a BCCH carrier signal in timeslots TS0 through TS7. In one implementation, to transition mobile devices receiving service from a macro cell to receiving service from a microcell, a penalty value may be applied to MSs devices that remain camped on a macro cell after power has resumed to one or more microcells having a coverage area reaching the mobile device. This consideration may control a rate of handover to enable an ordered way that maintains quality of service (QoS) and efficiency of handovers. The assessment of this can be done by the number of handover per second the serving cells are making. There is no bad user experience as long as NW are doing this in good time and orderly fashion. Here, a process to transition of MSs on a macro cell to microcells restored to full power may occur at a controlled rate to prevent contention on a random access channel (RACH) traffic.

Figure 5:
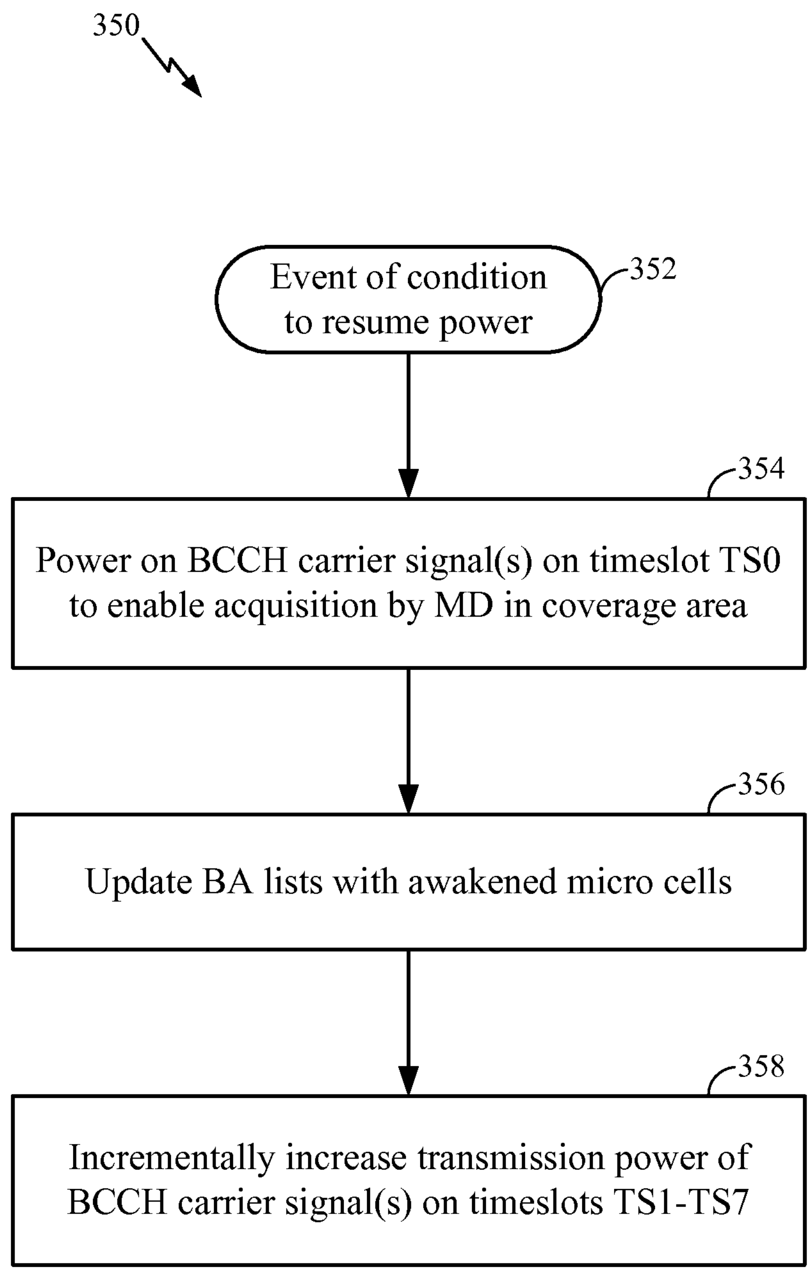
FIG. 5 is a flow diagram of a process to incrementally increase transmission power at a transmitter according to an embodiment.

FIG. 5 is a flow diagram of a process 350 of one or more microcells awakening from a reduced power state in response to such a condition or event detected at block 352 according to an embodiment. As pointed out above, conditions for resuming full power may be observed from a serving macro cell hitting a watermark of capacity threshold; or monitoring microcell ARFCNs by detect well occupied timeslots and high RxLev on the UL. At block 354, BCCH carrier signal(s) in a timeslot TS0 may be transmitted at a power level at least sufficient to enable acquisition of the BCCH carrier signal(s) by a mobile device in an associated coverage area. At block 356, macro cells' BA list may be updated with the ARFCNs of microcells to be awakened in response to the event or condition detected at 352. At block 358, power may incrementally resume at one or more remaining BCCH timeslots TS0 through TS1. In one implementation, to avoid contention in a RACH, power levels of timeslots TS0 through TS7 may not be switched on at the same time or at full power. For example, a power level in a timeslot among timeslots TS0 through TS7 may be raised at a particular sequence or rate to enable RACH and registration processing.

Figure 6:
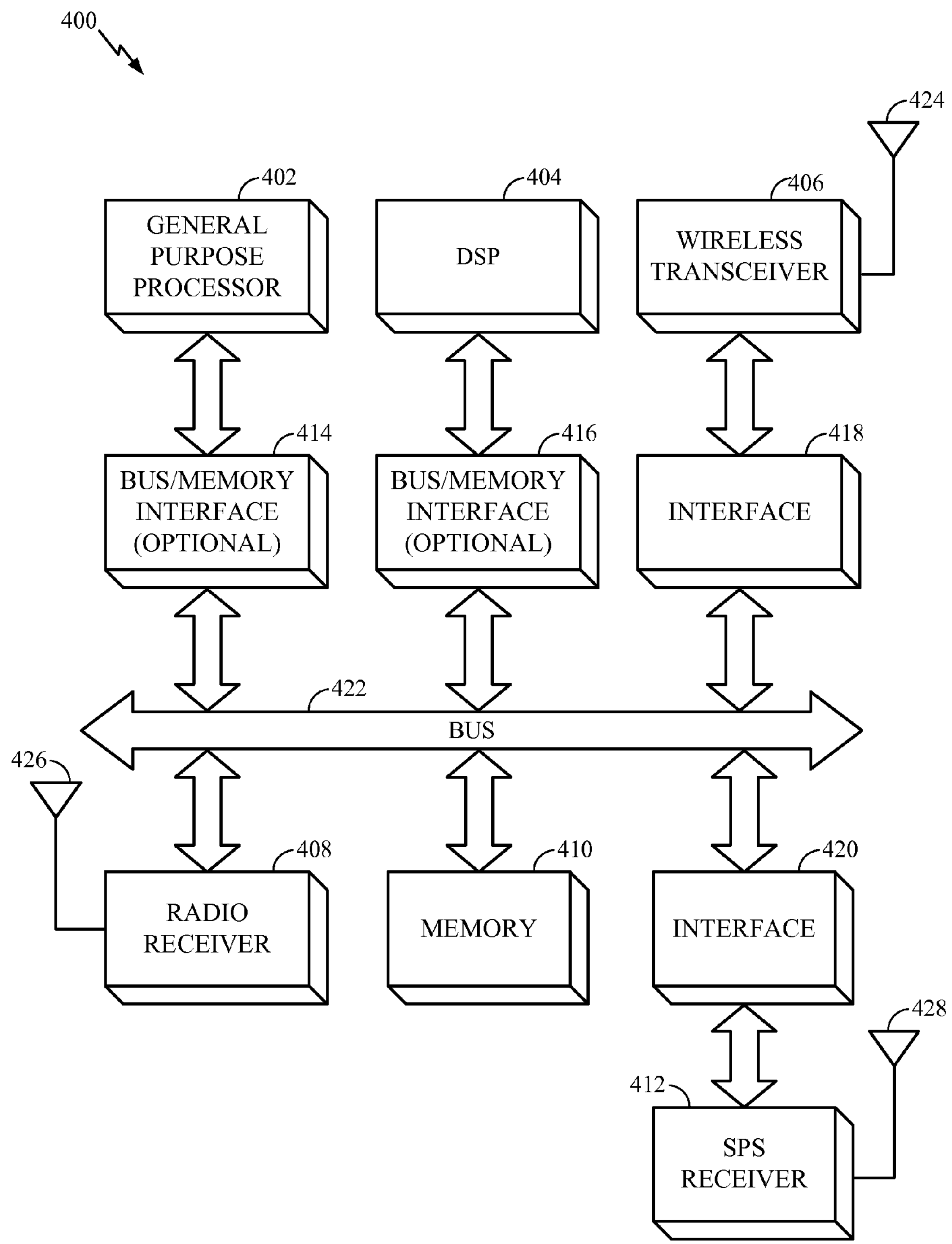
FIG. 6 is a schematic block diagram of a mobile device architecture that may be used in an implementation.

FIG. 6 is a schematic block diagram of an example mobile device architecture 400 that may be used in an implementation. Such a mobile device may be configured to acquire a BCCH carrier signal and/or be handed over between cells in a cellular network as described above. As illustrated, the mobile device architecture 400 may include, for example, a general purpose processor 402, a digital signal processor 404, a wireless transceiver 406, a radio receiver 408, a memory 410, and a satellite positioning system (SPS) receiver 412. A bus 422 or other alternative structure or structures may be provided for establishing interconnections between various components of the architecture 400. In the illustrated implementation, one or more interfaces 414, 416, 418, 420 may be provided between selected components and bus 422. The wireless transceiver 406, the radio receiver 408, and the SPS receiver 412 may each be coupled to one or more antennas 424, 426, 428, and/or other transducers, to facilitate the transmission and/or reception of wireless signals.

The general purpose processor 402 and the digital signal processor 404 are digital processing devices that are capable of executing programs to provide one or more functions and/or services to a user. One or both of these processors 402, 404 may be used, for example, to execute an operating system of a corresponding wireless device. One or both of these processors 402, 404 may also be used, for example, to execute user application programs including, for example, programs to reduce power utilization in a wireless communications system.

Wireless transceiver 406 may include any type of transceiver that is capable of supporting wireless communication with one or more remote wireless entities. In various implementations, wireless transceiver 406 may be configured in accordance with one or more wireless networking standards and/or wireless cellular standards. In some implementations, multiple wireless transceivers may be provided to support operation with different networks or systems in a surrounding environment. During mobile device operation, wireless transceiver 206 may be called upon to communicate with a base station or access point of a wireless communication system or network. Radio receiver 408 may be operative for receiving.

Memory 410 may include any type of device or component, or combination of devices and/or components that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

It should be appreciated that the mobile device architecture 400 of FIG. 5 represents one possible example of an architecture that may be used in a particular implementation. Other architectures may alternatively be used. It should also be appreciated that all or part of the various devices, processes, or methods described herein may be implemented using any combination of hardware, firmware, and/or software.

Figure 7:
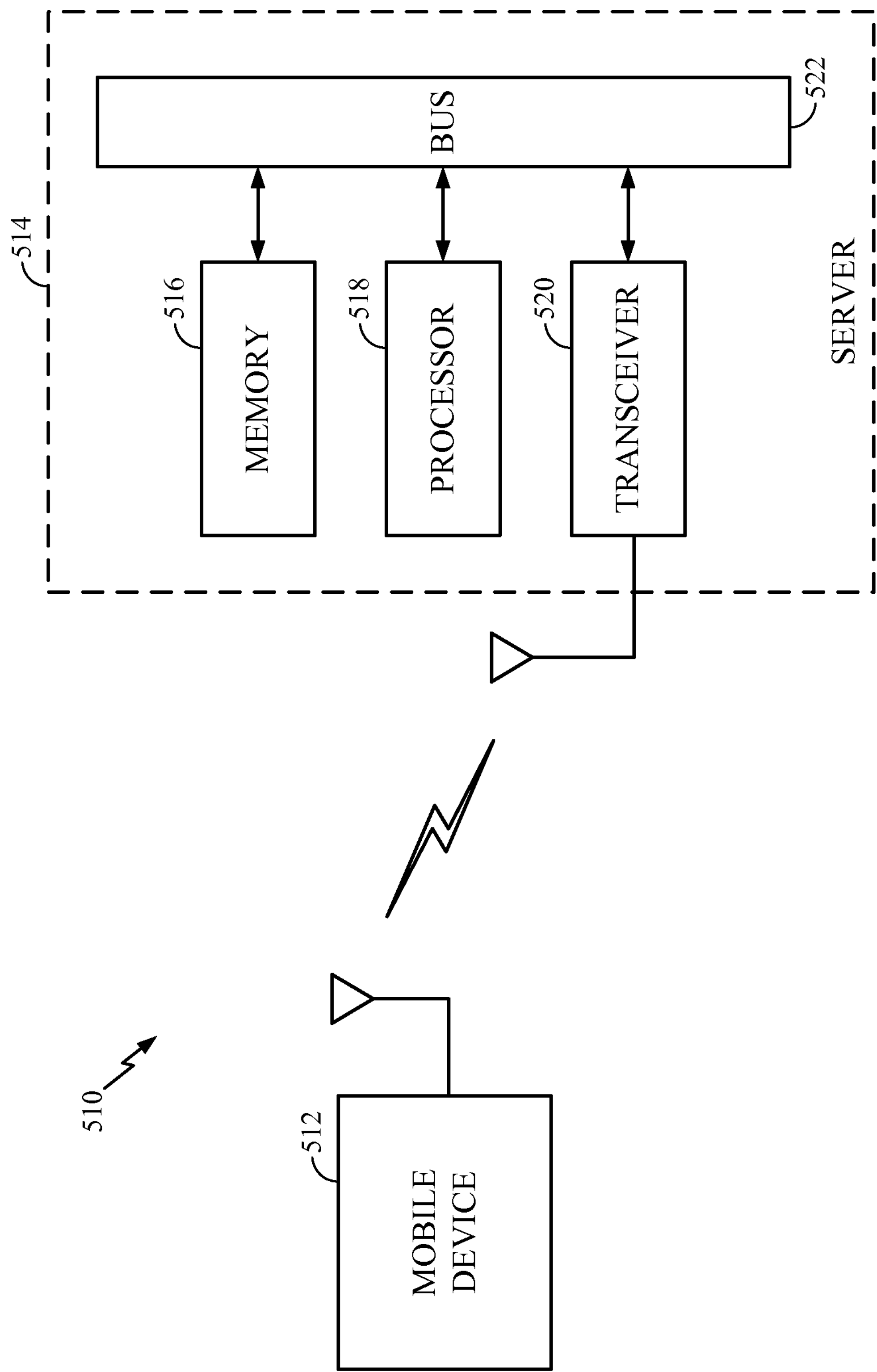
FIG. 7 is a schematic block diagram of a server architecture in accordance with an implementation.

FIG. 7 is a schematic diagram of a server 514 that may communicate with a mobile device 512. Server 514 may comprise a portion of a BTS or base station controller (BSC) in a cellular network to facilitate communication with mobile device 512. For example, as described above, server 514 may comprise a BTS that may transition to transmitting a BCCH carrier at a reduced power state in response to a determination of a reduced traffic condition. Server 514 may also comprise a BTS serving a macro cell to assume the servicing of calls that are handed over from microcells that are transitioning to transmission of a BCCH carrier signal at a reduced power state. In the illustrated implementation shown in FIG. 7, server 514 may include: a memory 516, a processor 518, a wireless transceiver 520, and a bus 522. These elements may be similar in structure and/or function to the corresponding elements of FIG. 6 described above. Memory 516 may include any type of device or component, or combination of devices and/or components that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

Other server architectures may alternatively be used. In some implementations, wireless transceiver 520 may be located outside of server 514. For example, in one possible approach, server 514 may communicate with wireless transceiver 520 via a wired network (e.g., an intranet, the Internet, etc.). Server 514 may include, for example, a network interface card (NIC) or similar functionality to facilitate communication over the wired network. The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon the application. For example, these methodologies can be implemented in hardware, firmware, software, or a combination thereof. For hardware implementations, processing may be implemented within, for example, one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, methodologies can be implemented with modules (e.g., procedures, functions, and so on) that perform functions described herein. Any machine readable digital medium tangibly embodying instructions can be used in implementing methodologies described herein. For example, software codes can be stored in a storage medium and executed by a processing unit. Storage can be implemented within a processing unit or external to a processing unit. As used herein, the terms "storage medium," "storage media," "storage device," "digital storage," or the like refer to any type of long term, short term, volatile, nonvolatile, or other storage structures and are not to be limited to any particular type of memory or number of memories, or type of media upon which data is stored.

If implemented in firmware and/or software, the functions may be stored as one or more instructions or code on a computer readable medium. Examples include computer readable media encoded with a data structure and computer readable media encoded with a computer program. Computer-readable media may take the form of an article of manufacture. Computer-readable media includes physical computer storage media. A computer readable storage medium may be any available digital medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Techniques described herein may be implemented in conjunction with various wireless communication networks such as, for example, a wireless wide area network (WWAN), a wireless local area network (WLAN), a wireless personal area network (WPAN), and so on. The terms "network" and "system" may be used interchangeably. The terms "position" and location" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as, for example, cdma2000, Wideband-CDMA (W-CDMA), and so on. Cdma2000 may include IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma 2000 is described in documents from a consortium named "3rd Generation Partnership Project 2" (3GPP2). 3GPP and 3GPP2 documents are publicly available. A WLAN may be, for example, an IEEE 802.11x network or some other type of network. A WPAN may be, for example, a Bluetooth network, an IEEE 802.15x network, or some other type of network. Techniques disclosed herein may also be implemented in conjunction with any combination of WWAN, WLAN, and/or WPAN.

As used herein, the term "mobile device" refers to a device such as a cellular telephone, smart phone, or other wireless communication device; a personal communication system (PCS) device; a personal navigation device (PND); a Personal Information Manager (PIM); a Personal Digital Assistant (PDA); a laptop computer; a tablet computer; a portable media player; or other suitable mobile or portable device which is capable of receiving wireless communication and/or navigation signals. The term "mobile device" is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, the term "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

Designation that something is "optimized," "required," or other similar designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

In the preceding detailed description, numerous specific details have been set forth to provide a thorough understanding of claimed subject matter. However, it will be understood by those skilled in the art that claimed subject matter may be practiced without these specific details. In other instances, methods or structures that would be known by one of ordinary skill have not been described in detail so as not to obscure claimed subject matter.

Some portions of the preceding detailed description have been presented in terms of logic, algorithms, or symbolic representations of operations on binary states stored within a storage medium of a specific apparatus or special purpose computing device or platform. In the context of this particular specification, the term specific apparatus or the like may include a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," "estimating," "initializing," or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

A computer-readable storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular disclosed examples, but that such claimed subject matter may also include all aspects falling within the scope of appended claims, and equivalents thereof.

What is claimed is:

1. A method, at a base station in a cellular communication network, comprising:

determining, at said base station, a reduced cellular traffic condition; and transitioning, at said base station, transmission of a broadcast control channel (BCCH) carrier signal to a reduced power state in response to determining said reduced traffic condition, wherein said BCCH carrier signal is transmitted as a carrier signal on timeslots, and wherein said transitioning transmission of said BCCH carrier signal to a reduced power further comprises changing transmission power of said carrier signal on an individual timeslot basis according to a variable transmission power profile.

2. The method of claim 1, wherein said changing said transition power on an individual timeslot basis comprises transmitting said carrier signal on two discrete and different power levels.

3. The method of claim 1, wherein said changing said transition power on an individual timeslot basis comprises transmitting said carrier signal on three discrete and different power levels.

4. The method of claim 1, wherein said changing said transition power on an individual timeslot basis comprises changing said transmission power on successive timeslots on fixed increments.

5. The method of claim 1, wherein determining said reduced traffic condition further comprises determining said reduced traffic condition based, at least in part, on a time of day or day of week.

6. The method of claim 1, wherein determining said reduced traffic condition further comprises receiving a signal or message from a macro cell.

7. The method of claim 6, wherein said signal or message received from said macro cell is based, at least in part, on detection of dummy slots transmitted from said base station.

8. A method, at a base station in a cellular communication network, comprising:

determining, at said base station, a reduced cellular traffic condition;

transitioning, at said base station, transmission of a broadcast control channel (BCCH) carrier signal to a reduced power state in response to determining said reduced traffic condition, wherein transitioning transmission of said BCCH carrier signal further comprises:

reducing transmission power of said BCCH carrier signal on timeslots TS1-TS7; and incrementally reducing transmission power of said BCCH carrier signal on timeslot TS0 following reduction of transmission power of said BCCH carrier signal on timeslots TS1-TS7.

9. A method, at a base station in a cellular communication network, comprising:

determining, at said base station, a reduced cellular traffic condition;

transitioning, at said base station, transmission of a broadcast control channel (BCCH) carrier signal to a reduced power state in response to determining said reduced traffic condition, and further comprising restoring transmission of said BCCH carrier signal in response to a signal by:

restoring transmission power to said BCCH carrier signal to a higher power state in a timeslot TS0 to enable acquisition by a mobile device in a coverage area; and incrementally increasing transmission power of said BCCH carrier signal in timeslots TS1-TS7 following restoration of transmission power to said BCCH carrier signal in timeslot TS0.

10. The method of claim 9, wherein transitioning transmission of said BCCH carrier signal to a reduced power state reduces interference to neighboring cells.

11. An apparatus comprising:

a base station comprising:

a transceiver to transmit a broadcast control channel (BCCH) carrier signal; and a processor configured to:

determine a reduced cellular traffic condition; and initiate transition of transmission of said BCCH carrier signal to a reduced power state in response to determining said reduced traffic condition, wherein said BCCH carrier signal is transmitted as a carrier signal on timeslots, and wherein said transitioning transmission of said BCCH carrier signal to a reduced power state further comprises changing transmission power of said carrier signal on an individual timeslot basis according to a variable transmission power profile.

12. The apparatus of claim 11, wherein said power profile is determined based, at least in part, on an estimated range between said at least one mobile device and said base station.

13. The apparatus of claim 11, wherein said variable transmission power profiles comprises maintaining a power level of said BCCH carrier signal for timeslot TS0 at a current power state and reducing a power level of said BCCH carrier signal on other timeslots.

14. The apparatus of claim 13, wherein said variable transmission profile comprises transmission of said carrier signal on two discrete and different power levels.

15. An article comprising:

a non-transitory storage medium comprising machine-readable instructions stored there which are executable by a special purpose computing apparatus to:

determine, at a base station, a reduced cellular traffic condition in a cell of a cellular communication network; and initiate, at said base station, transition of transmission of a broadcast control channel (BCCH) carrier signal to a reduced power state in said cell in response to determining said reduced traffic condition, wherein said BCCH carrier signal is transmitted as a carrier signal on timeslots, and wherein said reduced power state comprises a change of transmission power of said carrier signal on an individual timeslot basis according to a variable transmission power profile.

16. The article of claim 15, wherein said variable transmission profile comprises transmission of said carrier signal on two discrete and different power levels.

17. An apparatus comprising:

means for determining, at a base station, a reduced cellular traffic condition in a cell of a cellular communication network; and means for transitioning, at the base station, transmission of a broadcast control channel (BCCH) carrier signal to a reduced power state in response to determining said reduced traffic condition, wherein said BCCH carrier signal is transmitted as a carrier signal on timeslots, and wherein said means for transitioning transmission of said BCCH carrier signal to a reduced power further comprises means for changing transmission power of said carrier signal on an individual timeslot basis according to a variable transmission power profile.

18. The apparatus of claim 17, wherein said means for changing said transition power on an individual timeslot basis comprises means for transmitting said carrier signal on two discrete and different power levels.

19. A method comprising:

monitoring a first cell of a cellular communications network to detect a reduced traffic condition;

initiating a handover of one or more calls from said first cell to a second cell in response to detection of said reduced traffic condition; and transmitting a signal to said first cell to place said first cell in a reduced power state in response to detection of said reduced traffic condition, wherein said reduced power state comprises at least transmission of broadcast control channel (BCCH) carriers on timeslots at a lower transmission power, and changing transmission power of said BCCH carriers on an individual timeslot basis according to a variable transmission power profile.

20. The method of claim 19, wherein said monitoring further comprises detecting said reduced traffic condition based, at least in part, on detection of dummy bursts in timeslots of a BCCH carrier signal transmitted by a base station transmitter of said first cell.

21. The method of claim 19, and further comprising removing said first cell from at least one BCCH allocation (BA) lists of cells neighboring said first cell.

22. The method of claim 19, and further comprising updating a BCCH allocation (BA) list of said first cell to include an absolute radio-frequency channel number of at least one macro cell capable of servicing to be handed over.

23. The method of claim 19, and further comprising:

transmitting a signals to said first cell to resume to a full power state in response to detecting a condition or event to restore said first cell to a full power state; and updating at least one BA list of a neighboring cell with said restored first cell.

24. An apparatus comprising:

a transmitter; and a processor configured to:

monitor a first cell of a cellular communications network to detect a reduced traffic condition;

initiate a handover of one or more calls from said first cell to a second cell in response to detection of said reduced traffic condition; and initiate transmitting a signal through said transmitter to said first cell to place said first cell in a reduced power state in response to detection of said reduced traffic condition, wherein said reduced power state comprises at least transmission of broadcast control channel (BCCH) carriers on timeslots at a lower transmission power, and changing transmission power of said BCCH carriers on an individual timeslot basis according to a variable transmission power profile.

25. An article comprising:

a non-transitory storage medium comprising machine-readable instructions stored thereon which are executable by a special purpose computing apparatus to:

monitor a first cell of a cellular communications network to detect a reduced traffic condition;

initiate a handover of one or more calls from said first cell to a second cell in response to detection of said reduced traffic condition; and initiate transmission of a signal to said first cell to place said first cell in a reduced power state in response to detection of said reduced traffic condition, wherein said reduced power state comprises at least transmission of broadcast control channel (BCCH) carriers on timeslots at a lower transmission power, and changing transmission power of said BCCH carriers on an individual timeslot basis according to a variable transmission power profile.

26. An apparatus comprising:

means for monitoring a first cell of a cellular communications network to detect a reduced traffic condition;

means for initiating a handover of one or more calls from said first cell to a second cell in response to detection of said reduced traffic condition; and means for transmitting a signal to said first cell to place said first cell in a reduced power state in response to detection of said reduced traffic condition, wherein said reduced power state comprises at least transmission of broadcast control channel (BCCH) carriers on timeslots at a lower transmission power, and changing transmission power of said BCCH carriers on an individual timeslot basis according to a variable transmission power profile.

27. A method comprising:

monitoring a cellular call traffic load at a macro cell; and initiating one or more micro cells in said macro cell operating at a reduced power state to resume operation at a higher power state in response to detecting an increase in said cellular call traffic load based, at least in part, on changing a transmission power on timeslots of a BCCH carrier signal, said changing transmission power of said BCCH carriers on an individual timeslot basis according to a variable transmission power profile.

28. The method of claim 27, wherein initiating said one or more cells operating at said reduced power state to selectively determining loading of said macro cell.

29. The method of claim 27, is and further comprising updating a BCCH Allocation (BA) list in response to initiating said one or more micro cells in said macro cell operating at a reduced power state to resume operation at a higher power state.

30. The method of claim 27, wherein said one or more micro cells were transitioned to said reduced power state at a first rate, and wherein said one or more micro cells resume operation to said higher power state at a second rate higher than said first rate.

31. The method of claim 27, and further comprising initiating handover of calls between said macro cell and at least one of said one or more micro cells in response to changes in a power state of said at least one of said one or more micro cells.

* * * * *